United States Patent [19]

Hoffelner

[11] Patent Number: 4,752,077
[45] Date of Patent: Jun. 21, 1988

[54] SLIDING RING SEAL

[75] Inventor: Herbert Hoffelner, Roehrmoos, Fed. Rep. of Germany

[73] Assignee: MTU Motoren-und Turbinen Union Muenchen GmbH, Munich, Fed. Rep. of Germany

[21] Appl. No.: 936,826

[22] Filed: Dec. 2, 1986

[30] Foreign Application Priority Data

Dec. 20, 1985 [DE] Fed. Rep. of Germany ....... 3545281

[51] Int. Cl.$^4$ .............................................. F16J 15/38
[52] U.S. Cl. ........................................ 277/22; 277/25; 277/59; 277/65; 277/71; 277/81 R; 277/216
[58] Field of Search ................... 277/22, 25, 58, 59, 277/60, 65, 71, 72 R, 81 R, 82, 83, 85, 173–175, 216

[56] References Cited

U.S. PATENT DOCUMENTS

| 2,323,730 | 7/1943 | Shenton et al. ............... 277/22 X R |
| 3,241,842 | 3/1966 | Schweiger et al. .................... 277/22 |
| 4,313,608 | 2/1982 | Scott ............................ 277/65 X R |
| 4,398,730 | 8/1983 | Rucker ................................. 277/22 |
| 4,410,187 | 10/1983 | Legoy et al. ........................... 277/25 |

FOREIGN PATENT DOCUMENTS

| 1212800 | 3/1966 | Fed. Rep. of Germany. |
| 3119467 | 9/1983 | Fed. Rep. of Germany. |
| 15365 | 10/1926 | Netherlands ........................... 277/22 |
| 735591 | 8/1955 | United Kingdom .................. 277/65 |

Primary Examiner—Robert S. Ward
Attorney, Agent, or Firm—W. G. Fasse; D. H. Kane, Jr.

[57] ABSTRACT

A seal between rotating machine components, such as two hollow shafts, is constructed as a sliding ring seal. An axially and radially effective sealing is achieved by using a centrifugal force for causing a wedging effect on sealing elements which are axially and radially effective.

15 Claims, 2 Drawing Sheets

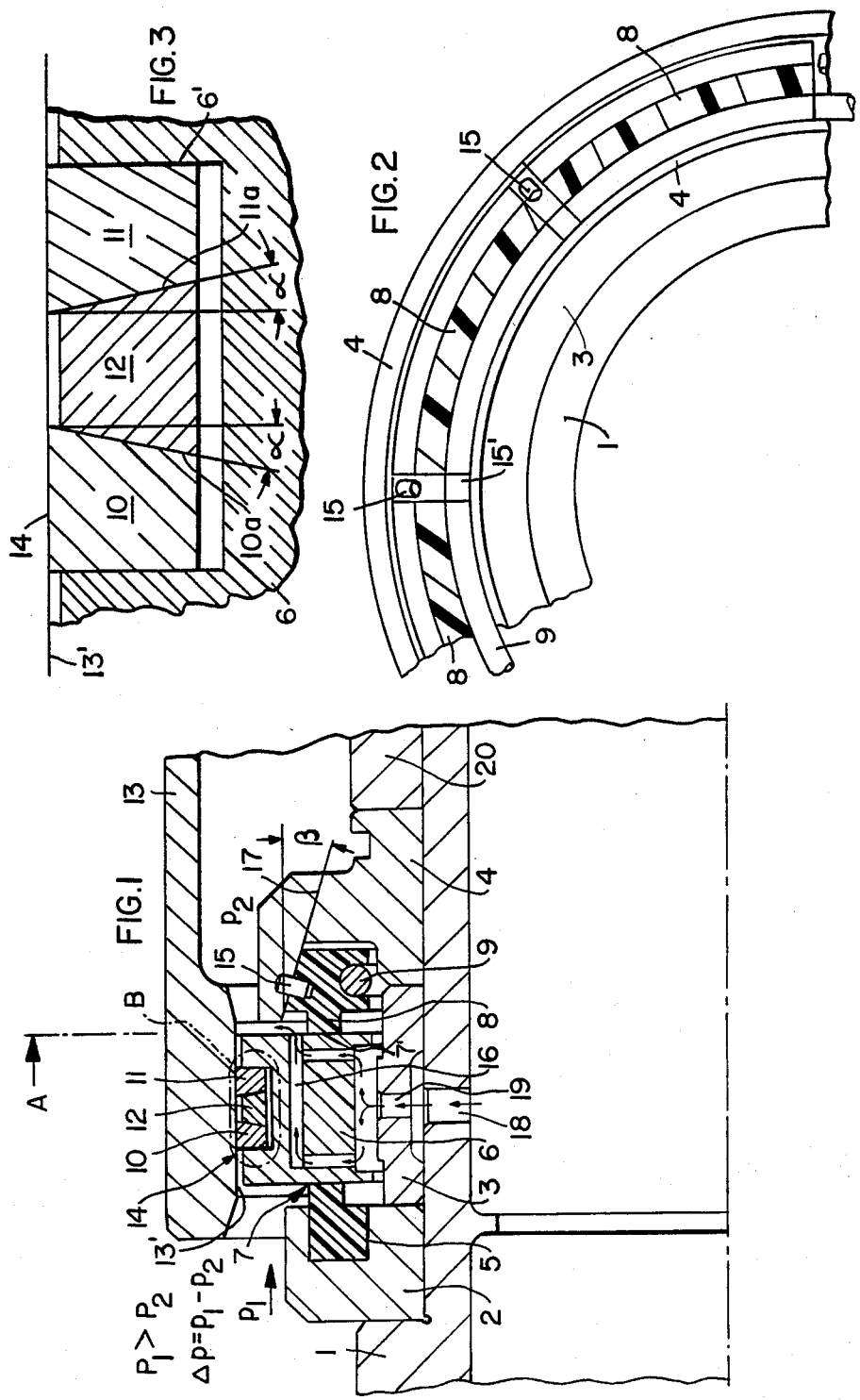

SLIDING RING SEAL

FIELD OF THE INVENTION

The invention relates to a sliding ring seal for use between rotating machine components, whereby two spaces under different pressures are sealed from each other.

DESCRIPTION OF THE PRIOR ART

In a sealing ring of this type for sealing a shaft exiting from a space under pressure, a sealing surface of the sealing ring is in a sealing contact with a counter rotating ring, whereby cooling fluid channels are provided for supplying a cooling medium to the cooperating sealing surfaces for cooling and friction reducing purposes. The cooling medium or fluid is kept in circulation by centrifugal forces.

German Patent Publication (DE-AS) No. 1,212,800 discloses a sealing device wherein a centrifugal pump is connected to a system of suction and pressure channels. Such a channel system is considered to be important for gas pumps, more specifically, pumps for gaseous media in which it is especially important to avoid the problem of wear and tear and the resulting seizing of pump components rotating relative to each other.

German Patent Publication (DE-OS) No. 3,119,467 discloses a seal for a gas dynamic bearing using a gas pad or so-called lift pad for producing a gas dynamic lubricating wedge. To maintain such a lubricating wedge the known bearing uses a periodically and uniformly corrugated sliding surface at the counter ring of the seal.

In both conventional devices axially effective spring elements are used to keep the rings in a mutually sealing contact. However, the known sealing devices are of limited usability when it is necessary to provide a seal between rotating machine components because the required axially effective spring elements have inherent characteristics which are not quite suitable for the purposes of maintaining the required compressive sealing forces.

OBJECTS OF THE INVENTION

In view of the foregoing it is the aim of the invention to achieve the following objects singly or in combination:

to provide a sliding ring seal which is especially adapted for use between two rotating shafts, particularly counter rotating shafts in which the compressive forces of the sealing elements are derived from centrifugal forces which are effective during the operation of the seal;

to avoid the use of spring elements of the kind which require a particular spring characteristic to achieve the desired sealing purpose; and to provide means which enable a more definite preselection of the force components which are effective for an axial and radial seal, specifically to maintain these seals.

SUMMARY OF THE INVENTION

The seal according to the invention is characterized in that at a primary sealing location a counter rotating ring is pressed in an axial direction against the sliding ring of the seal under effect of centrifugal force and that at a secondary sealing location piston rings are pressed in the radial direction against an outer machine component such as a hollow shaft under the bias of a spring, whereby a respective axial or radial force component results from a wedging action also caused by centrifugal force.

Particular advantages of the invention are seen in that the present seal is suitable for use between shafts rotating both in the same direction, or rotating in opposite directions.

By deriving the required sealing forces primarily from the centrifugal forces occurring during operation, it is now unnecessary to rely on specific spring characteristics for the required sealing forces.

The relative motions between two rotating shafts in a radial direction, for example, as a result of vibrations, unbalance, bearing play, and so forth, do not influence the radially effective sealing gap.

The axially effective force component which provides a compression for the radially effective sealing can be determined by respectively selecting the size of a wedging angle $\beta$ which opens approximately in the axial direction of the longitudinal rotational axis. The radially effective force component for determining the sealing characteristics of the axially effective seal can be determined by respectively selecting the size of the wedging angle $\alpha$. Thus, the force components effective in the radial and in the axial direction can be properly determined.

Yet another advantage of the invention is seen in that the torque moment that may be transmitted through the secondary seal which is axially effective can be selected always to be larger than the sum of any friction caused moments. Further, the axially effective compression force is larger than the sum of the forces resulting from the pressure loading of the seal and any axial displacement of the respective shafts. By mounting all sealing components on one shaft the assembly of the seal is greatly simplified, thereby also facilitating any maintenance work. The mounting and assembly is further simplified in that all sealing components are inserted into a cylindrical bore of an outer hollow shaft.

BRIEF DESCRIPTION OF THE DRAWINGS

In order that the invention may be clearly understood, it will now be described, by way of example, with reference to the accompanying drawings, wherein:

FIG. 1 shows a sectional view through a sliding ring seal according to the invention, whereby only a portion is shown since the lower portion is mirror-symmetrical to the portion shown;

FIG. 2 is a sectional view along section plane A—A in FIG. 1;

FIG. 3 shows on an enlarged scale the detail B of the axially effective piston ring seal.

Figure 4:
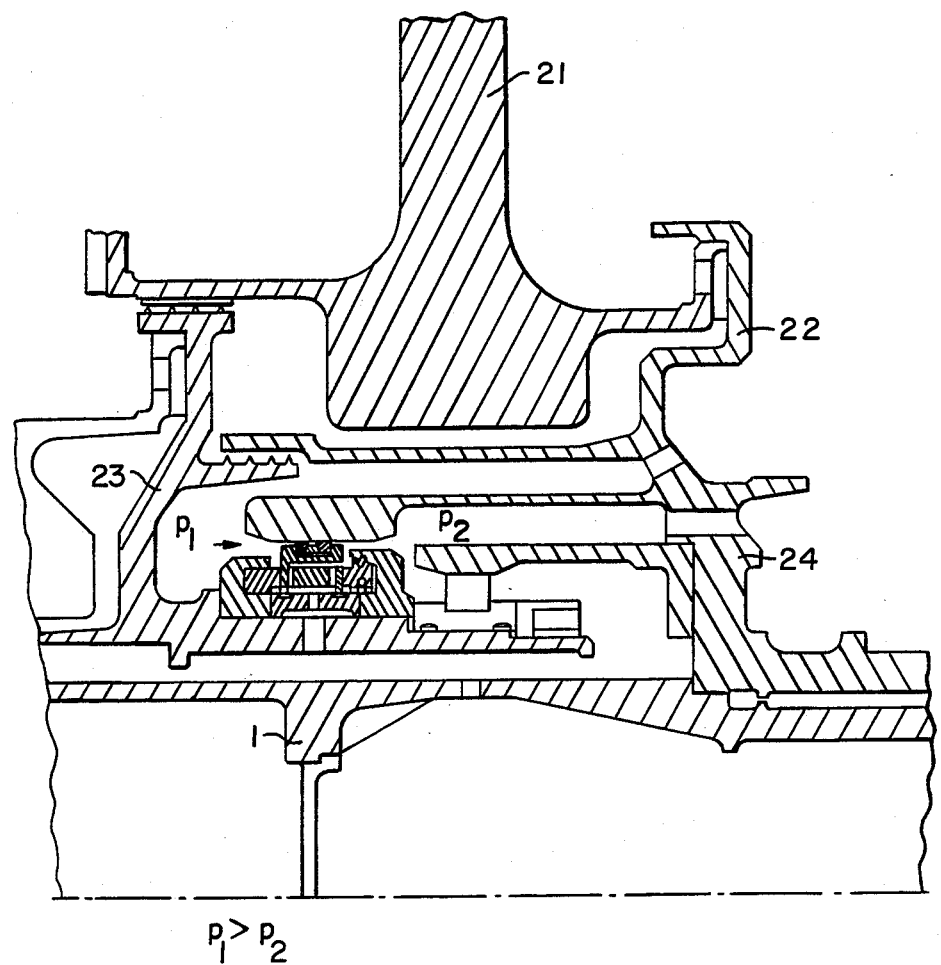
FIG. 4 shows the installation of a sliding ring seal according to the invention in a gas turbine.

DETAILED DESCRIPTION OF PREFERRED EXAMPLE EMBODIMENTS AND OF THE BEST MODE OF THE INVENTION

Referring to FIG. 1, a first carrier ring 2, a distributor ring 3 for the cooling fluid, and a second carrier ring 4 are mounted on an inner shaft 1, for example forming a hollow shaft. The first carrier ring 2 is provided with a circular groove in which a first sealing ring 5, also referred to as a sliding ring, is held in place as described below. A counter rotating ring 6 surrounds the distributor or spacer ring 3 with sufficient radial play and provides a first or primary sealing surface 7 between an axially facing end portion of the sealing ring 5 and an also axially facing end wall of the counter rotating ring 6. The seal 7 is radially effective. A further radially effective seal 7' is formed between the rightwardly facing end surface of the counter rotating ring 6 and the axially facing end portion of a further sealing ring 8 mounted in a recess of the mounting ring 4.

As shown in FIG. 2, the second sealing ring 8 may be made to comprise a plurality of ring segments uniformly distributed circumferentially in the mounting recess of the mounting ring 4. The ring segments of the sealing ring 8 are held in place by a spring ring 9 which is so biassed that it provides a radially outwardly effective biassing force. Thus, in operation the ring segments of the ring 8 are pressed radially outwardly aided by centrifugal force against a wedging surface member 17 formed by a first conical surface surrounding the mounting recess in the ring 4 and cooperating with a second conical surface surrounding the sealing ring 8. These conical surfaces 17 form a wedging angle $\beta$ with a line extending in parallel to the rotational longitudinal axis of the machine components, such as a first hollow shaft 1 and a second hollow shaft 13. By properly selecting the angle $\beta$ which opens approximately in the axial direction, it is possible to determine the axial force components which provide the compressions at the primary seal locations 7 and 7' for maintaining the radially effective seals at these locations 7, 7'.

Incidentally, the rings 5 and 8 are, for example, made of carbon, such as graphite and similar materials known for this purpose.

FIGS. 1 and 2 taken in conjunction show how the ring segments 8 are secured to the mounting ring 5 with the aid of pins 15 extending through the wedging surface 17. The pins 15 are rigidly secured to the ring 5. The pins 15 have a cylindrical cross-section and function as entraining cam members in the circumferential direction of the ring 4. The projecting end of the pins 15 reaches with a loose sliding fit into respective holes in the sealing ring segments 8. These holes may actually be gaps 15' between neighboring ring segments 8 as shown in FIG. 2.

The counter rotating ring 6 has a radially outwardly open groove 6' in which piston ring type sealing rings 10, 11, and a second spring ring 12 are held.

A secondary, axially effective seal 14 is provided between these sealing rings 10 and 11 on the one hand, and the radially inwardly facing surface of a cylindrical bore 13' in the outer hollow shaft 13 on the other hand. The rings 10 and 11 have slanted surfaces 10a and 11a respectively and include an angle $\alpha$ with a radial plane as best seen in FIG. 3. The ring 12 is a spring ring made of spring steel and also has slanted surfaces for cooperation with the slanted surfaces 10a and 11a to apply a radially effective wedging action to the rings 10 and 11. Thus, by selecting the angle $\alpha$ it is possible to determine the required radially effective compression component. Thus, the counter rotating ring is connected to the hollow shaft 13 in a force locking manner and rotates in unison with the hollow shaft 13.

Due to the rotation of the hollow shaft 13 centrifugal forces are effective on the rings 10, 11, and 12, whereby the compression force between the hollow shaft 13 and the radially outer surface of the sealing rings 10 and 11 is increased, while simultaneously also increasing the axially effective compression force which presses the sealing rings 10 and 11 against the axially facing surfaces of the groove 6' in the counter rotating ring 6. As the r.p.m. of the shaft 13 increases, the torque moment transmittable through the secondary sealing 14 also increases. This torque moment must always be higher than the sum of the frictional moments caused by the axially effective force components at the primary sealing locations 7, 7'.

Due to the rotation of the inner shaft 1 the sealing or sliding ring segments 8 and the spring ring 9 are also subject to centrifugal forces and other forces. These centrifugal forces are converted into force components effective in the radial direction perpendicularly to the rotational axis of the shaft 1 and in the axial direction that is parallel to the rotational shaft 1. The conversion depends on the wedging angle $\beta$, that is, on the slant of the surface 17. The resulting axial force component presses the sealing rings 5 and sealing ring segments 8 against the surfaces of the counter rotating ring 6 to form the two primary sealing locations 7 and 7'. This axially effective force component must always be larger than the sum of the forces which result from the pressure differential across the seal (P1 - P2) and forces resulting from an axial displaceability of the counter rotating ring 6 relative to the hollow shaft 13. It is assumed that the pressure P1 shown in the space to the left of the seal is larger than the pressure P2 on the other side in the space surrounded by the hollow shaft 13. Thus, the compression force effective axially at the radial seal locations 7, 7' is the counter force against any axial shifting force that tends to shift the shafts relative to each other and to the forces caused by the pressure differential. As mentioned, the proper selection of the angle $\beta$ will provide the required force components. Thus, the primary seal locations 7, 7' will be maintained in a sealing condition even if there are relative motions of all kinds between the shafts 1 and 13.

The cooling of the seal is accomplished by cooling medium flow ducts 18 in the shaft 1, 19 in the spacer ring 3, and 16 in the counter rotating ring 6. The cooling medium is, for example, supplied from a bearing chamber or from a circulating system not shown in further detail. The spacer ring 3 distributes the cooling medium and is held in place together with the other mounting rings 2 and 4 by a further mounting ring 20, for example screwed onto a threading of the inner shaft 1.

The spring ring 12 and the sealing rings 10 and 11 are inserted into the groove 6' of the counter rotating ring 6 prior to insertion into the bore 16' of the outer shaft 13.

As mentioned, due to the wedging surfaces 10a, 11a, and 17, the centrifugal forces are divided into radial and axial components for properly maintaining the primary seals 7, 7' and the secondary seal 14.

Spring materials for making the rings 9 and 12 are well known in the art. Further, the particular configuration shown is not intended to limit the claimed invention. For example, it is possible to provide the rings 5, the ring segments 8, and the rings 10 and 11 with friction reducing surface coatings at the interface with the rotating ring 6 or with the spring ring 12. Further, the number of shafts that can be provided with seals according to the invention is not limited. For example, the shaft 13 may also be an intermediate shaft surrounded by a further shaft with a seal as shown in FIG. 1 between the shaft 13 and the further shaft.

FIG. 4 shows a sectional view through a gas turbine power plant comprising several concentric shafts and showing one stage of a turbine rotor with rotor vanes 21 and a mounting frame 22 which is supported on inner rotating components 23, 24 which may in effect be hollow shafts. These hollow shafts are supported relative to each other by a seal as described above with references to FIGS. 1, 2, and 3.

Although the invention has been described with reference to specific example embodiments, it will be appreciated, that it is intended to cover all modifications and equivalents within the scope of the appended claims.

What I claim is:

1. A sliding ring seal arranged between rotating machine components for sealing a first space which is under a first pressure from a second space which is under a second pressure, comprising first axially facing, radially effective sealing ring means, second axially facing, radially effective sealing ring means, said first and second sealing ring means having sealing surfaces facing axially toward each other, a rotating ring (6) between and in contact with said sealing surfaces of said first sealing ring means and of said second sealing ring means for providing radially effective seals, mounting means (2, 3, 4, 20) for mounting said first and second sealing ring means on one of said rotating machine components, said mounting means comprising a conical surface member, one of said first and second sealing ring means having a conical surface for cooperating with said conical surface member, a first ring spring (9) for pressing said conical surface against said conical surface member for maintaining said radially effective seals by determining an axially effective sealing ring compressing force, a group of three piston ring type rings including two sealing rings (10, 11) and a further ring spring (12), said group of three rings being located between said rotating ring (6) and another of said rotating machine components for providing an axially effective seal, said group of three rings having further cooperating conical surfaces for applying a substantially radially effective centrifugal force to said three rings to maintain said axially effective seal.

2. The sliding ring seal of claim 1, wherein said conical surface member and said conical surface define an angle (β) opening substantially axially relative to a direction of a longitudinal rotational axis of said machine components, said substantially axial angle determining said axially effective sealing ring compressing force to maintain said radially effective seals, and wherein said further cooperating conical surfaces define a substantially radially opening angle (α) relative to a radial direction, said substantially radially opening angle (α) determining said substantially radially effective centrifugal force to maintain said axially effective seal.

3. The sliding ring seal of claim 2, wherein said angle (β) is selected in accordance with the force which is needed for axially compressing said first and second sealing rings to maintain satisfactory radially effective seals.

4. The sliding ring seal of claim 2, wherein said angle (α) is selected in accordance with the force which is needed for radially pressing said group of three piston ring type rings against said other machine component to maintain a satisfactory axial seal.

5. The sliding ring seal of claim 1, wherein said piston ring type sealing rings (10, 11) are in friction contact with said other machine component, said friction contact transmitting a given torque moment, said piston ring type sealing rings having substantially radial surfaces in sliding contact with said rotating ring (16), said substantially radial surfaces of said piston ring type sealing rings being so dimensioned that the sum of any resulting friction moments is smaller than said given torque moment.

6. The sliding ring seal of claim 1, wherein said axially effective sealing ring compressing force for said radially effective seals is larger than the sum of the pressure difference between said first and second pressures plus any axial displacement force of said rotating ring (6) relative to said other rotating machine component.

7. The sliding ring seal of claim 1, wherein said second sealing ring with said second conical surface comprises a plurality of sealing ring segments (8) supported on said first ring spring.

8. The sliding ring seal of claim 7, wherein said mounting means comprise engagement pins extending approximately radially outwardly from said ring segments, said ring segments having openings therein for receiving said engagement pins with a sliding fit in said openings of said ring segments.

9. The sliding ring seal of claim 8, wherein said bores are located in said conical surface member of said mounting means, and wherein said conical surface is provided on said ring segments for cooperation with said conical surface member.

10. The sliding ring seal of claim 1, wherein said two machine components are movable relative to each other.

11. The sliding ring seal of claim 10, wherein said two machine components are hollow shafts which rotate in opposite directions.

12. The sliding ring seal of claim 1, wherein at least one of said two machine components is a shaft, said radially effective sealing ring means and said rotating ring (6) being mounted on said shaft.

13. The sliding ring seal of claim 1, wherein at least one of said two machine components is an outer hollow shaft having a cylindrical bore therein, said sliding sealing rings being inserted in said cylindrical bore.

14. The sliding ring seal of claim 1, wherein said rotating ring (6) is free to slide in a plane extending perpendicularly, that is radially, relative to a longitudinal rotational axis of said machine components.

15. A seal between rotating machine components constructed as a sliding ring seal for a shaft exiting from a space under compression, wherein a ring having a sealing surface and a counter rotating ring may be brought into a sealing contact with each other, wherein a cooling fluid is caused to circulate, due to centrifugal forces, in channels leading to said sealing surfaces for cooling and friction reduction, characterized by a primary sealing location (7) at which said counter rotating ring (6) is pressable in an axial direction against a sliding ring (5) under centrifugal force, and by a secondary sealing location (14) at which piston rings (10, 11) are pressable against an outer shaft (13) under a bias of a spring (9), by means of an axial and radial force component which are caused by a wedging action.

* * * * *